(12) United States Patent
Schicketanz et al.

(10) Patent No.: US 10,203,435 B2
(45) Date of Patent: Feb. 12, 2019

(54) EUV MIRROR AND OPTICAL SYSTEM COMPRISING EUV MIRROR

(71) Applicant: Carl Zeiss SMT GmbH, Oberkochen (DE)

(72) Inventors: Thomas Schicketanz, Aalen (DE); Oliver Dier, Lauchheim (DE); Sebastian Strobel, Aalen (DE); Ralf Winter, Schwaebisch Gmuend (DE)

(73) Assignee: CARL ZEISS SMT GMBH, Oberkochen (DE)

( * ) Notice: Subject to any disclaimer, the term of this patent is extended or adjusted under 35 U.S.C. 154(b) by 212 days.

(21) Appl. No.: 15/215,123

(22) Filed: Jul. 20, 2016

(65) Prior Publication Data
US 2016/0327702 A1 Nov. 10, 2016

Related U.S. Application Data

(63) Continuation of application No. PCT/EP2015/050687, filed on Jan. 15, 2015.

(30) Foreign Application Priority Data

Jan. 20, 2014 (DE) .................. 10 2014 200 932

(51) Int. Cl.
*G02B 5/08* (2006.01)
*G21K 1/06* (2006.01)

(52) U.S. Cl.
CPC ............ *G02B 5/0891* (2013.01); *G02B 5/08* (2013.01); *G02B 5/0816* (2013.01); *G02B 5/0875* (2013.01); *G21K 1/062* (2013.01)

(58) Field of Classification Search
CPC ...... G02B 5/0891; G02B 5/0816; G02B 5/08; G02B 5/0875; G21K 1/062; G21K 1/06
(Continued)

(56) References Cited

U.S. PATENT DOCUMENTS 6,333,961 B1   12/2001   Murakami
6,449,086 B1    9/2002   Singh
(Continued)

FOREIGN PATENT DOCUMENTS

DE    10150874 A1    4/2003
DE    10155711 A1    5/2003
(Continued)

OTHER PUBLICATIONS

International Search Report (with English translation thereof) and Written Opinion in counterpart International Application No. PCT/EP2015/050687, dated Apr. 22, 2015.
(Continued)

*Primary Examiner* — William R Alexander
(74) *Attorney, Agent, or Firm* — Edell, Shapiro & Finnan, LLC

(57) ABSTRACT

An EUV mirror has a multilayer arrangement applied on a substrate. The multilayer arrangement includes a first layer group having ten or more first layer pairs. Each first layer pair has a first layer composed of a high refractive index first layer material having a first layer thickness, has a second layer composed of a low refractive index second layer material having a second layer thickness and has a period thickness corresponding to the sum of the layer thicknesses of all the layers of a first layer pair. The layer thicknesses of one of the layer materials are defined, depending on the period number, by a simply monotonic first layer thickness profile function, e.g. by a linear, quadratic or exponential layer thickness profile function. The layer thicknesses of the other of the layer materials vary, depending on the period number, in accordance with a second layer thickness profile function.

16 Claims, 6 Drawing Sheets

(58) Field of Classification Search
USPC .......................................................... 359/360
See application file for complete search history.

(56) References Cited

U.S. PATENT DOCUMENTS

| | | | |
|---|---|---|---|
| 6,724,462 | B1 | 4/2004 | Singh et al. |
| 7,977,651 | B2 | 7/2011 | Mann et al. |
| 2002/0171922 | A1* | 11/2002 | Shiraishi .................. G02B 5/08 359/359 |
| 2003/0043456 | A1 | 3/2003 | Singh |
| 2004/0253426 | A1 | 12/2004 | Yakshin et al. |
| 2007/0171327 | A1 | 7/2007 | Matsumoto et al. |
| 2008/0137810 | A1 | 6/2008 | Liu et al. |
| 2011/0261343 | A1 | 10/2011 | Wedowski |
| 2012/0239138 | A1 | 9/2012 | Weber et al. |
| 2013/0038929 | A1 | 2/2013 | Muellender et al. |
| 2016/0195648 | A1 | 7/2016 | Schicketanz et al. |

FOREIGN PATENT DOCUMENTS

| | | |
|---|---|---|
| DE | 60036510 T2 | 6/2008 |
| DE | 102009054653 A1 | 6/2011 |
| DE | 102013200294 A1 | 7/2014 |
| JP | 2007134464 A | 5/2007 |
| JP | 2011007501 A | 1/2011 |
| JP | 2011075600 A | 4/2011 |
| WO | 2004097467 A1 | 11/2004 |
| WO | 2009043374 A1 | 4/2009 |

OTHER PUBLICATIONS

Kuhlmann, T. et al., "EUV multilayer mirrors with tailored spectral reflectivity", Proceedings of SPIE, vol. 4782, Dec. 1, 2002, p. 196-203.

Wang. Z. et al., "Optimisation of depth-graded multilayer designs for EUV and xray optics", Proceedings of SPIE, vol. 4145, 2001, p. 243-253.

Wang. Z. et al., "Broadband multilayer mirrors for optimum use of xray source output", 1 Opt. A: Pure Appl. Opt 2, 2000, p. 452-457.

Office Action in corresponding German Application No. 102014200932.4, dated Sep. 12, 2014.

JP Office Action for corresponding JP Application 2016-564397 with English Summary, dated Oct. 30, 2018, 6 pages.

English translation of Japanese Office Action, 2016-564397, drafting date Oct. 23, 2018, 5 pages.

* cited by examiner

EUV MIRROR AND OPTICAL SYSTEM COMPRISING EUV MIRROR

CROSS REFERENCE TO RELATED APPLICATIONS

This is a Continuation of International Application PCT/EP2015/050687, which has an international filing date of Jan. 15, 2015, and the disclosure of which is incorporated in its entirety into the present Continuation by reference. The following disclosure is also based on and claims the benefit of and priority under 35 U.S.C. § 119(a) to German Patent Application No. DE 10 2014 200 932.4, filed Jan. 20, 2014, which is also incorporated in its entirety into the present Continuation by reference.

FIELD OF THE INVENTION

The invention relates to a mirror for extreme ultraviolet (EUV) radiation and to an optical system including such an EUV mirror. One preferred field of application is EUV microlithography. Further fields of application are in EUV microscopy and EUV mask metrology.

BACKGROUND

Microlithographic projection exposure methods are predominantly used nowadays for producing semiconductor components and other finely structured components, e.g. masks for microlithography. Here, use is made of masks (reticles) or other pattern generating devices, which carry or form the pattern of a structure to be imaged, e.g. a line pattern of a layer of a semiconductor component. The pattern is positioned in a projection exposure apparatus between an illumination system and a projection lens in the region of the object plane of the projection lens and is illuminated with an illumination radiation provided by the illumination system. The radiation changed by the pattern passes as projection radiation through the projection lens, which images the pattern onto the substrate which is to be exposed and is coated with a radiation-sensitive layer and whose surface lies in the image plane of the projection lens, said image plane being optically conjugate with respect to the object plane.

In order to be able to produce ever finer structures, in recent years optical systems have been developed which operate with moderate numerical apertures and obtain high resolution capabilities substantially by means of the short wavelength of the electromagnetic radiation used from the extreme ultraviolet range (EUV), in particular with operating wavelengths in the range of between 5 nm and 30 nm. In the case of EUV lithography with operating wavelengths around 13.5 nm, for example given image-side numerical apertures of NA=0.3 theoretically a resolution of the order of magnitude of 0.03 μm can be achieved with typical depths of focus of the order of magnitude of approximately 0.15 μm.

Radiation from the extreme ultraviolet range cannot be focused or guided with the aid of refractive optical components, since the short wavelengths are absorbed by the known optical materials that are transparent at higher wavelengths. Therefore, mirror systems are used for EUV lithography. One class of EUV mirrors operates at relatively high angles of incidence of the incident radiation, that is to say with grazing incidence according to the principle of total internal reflection. Multilayer mirrors are used for normal or almost normal incidence of radiation. Such a mirror (EUV mirror), having a reflective effect for radiation from the EUV range has a substrate, on which is applied a multilayer arrangement having a reflective effect for radiation from the extreme ultraviolet range (EUV), said multilayer arrangement comprising many layer pairs comprising alternately low refractive index and high refractive index layer material. Layer pairs for EUV mirrors are often constructed with the layer material combinations molybdenum/silicon (Mo/Si) or ruthenium/silicon (Ru/Si).

It is known that the reflectivity or the reflectance of multilayer mirrors is greatly dependent on the angle of incidence and on the wavelength of the incident EUV radiation. A high maximum value of the reflectivity can be achieved if the multilayer arrangement substantially consists of a periodic layer sequence having a multiplicity of identical layer pairs. However, a relatively low full width at half maximum (FWHM) of the reflectivity curve then results both in the case of the dependence of the reflectivity on the angle of incidence and in the case of the dependence of the reflectivity on the wavelength.

In optical systems for the EUV range having a relatively high numerical aperture, for example in projection lenses for EUV microlithography, relatively high angle of incidence variations can occur, however, at certain positions in the beam path. This necessitates EUV mirrors whose reflectance varies only relatively little over the angle of incidence range respectively occurring. Numerous proposals have already been made concerning the construction of such multilayer mirrors which are broadband in the angle of incidence range.

The article "EUV multilayer mirrors with tailored spectral reflectivity" by T. Kuhlmann, S. Yulin, T. Feigl and M. Kaiser in: Proceedings of SPIE Vol. 4782 (2002) pages 196 to 203, describes a layer construction of EUV mirrors having a broadband effect. The multilayer arrangement comprises a plurality of layer groups each having a periodic sequence of at least two individual layers of different materials that form a period. The number of periods and the thickness of the periods of the individual layer groups decrease from the substrate toward the surface. One exemplary embodiment has three different layer groups. What is intended to be achieved by this layer construction is that, on the one hand, the peak wavelengths of the reflection maxima of the respective layer groups are shifted to shorter wavelengths from the substrate toward the surface, such that a wider reflection peak of the overall system is produced by the superimposition of the reflection of the individual layer groups. On the other hand, all the layer groups can contribute approximately identically to the reflectivity of the overall system. In this way, it is possible to achieve an almost constant reflectivity over a large wavelength range or angular range.

The article "Broadband multilayer mirrors for optimum use of soft x-ray source output" by Z. Wang and A. G. Michette in: J. Opt. A: Pure Appl. Opt. 2 (2000) pages 452-457 and the article "Optimisation of depth-graded multilayer designs for EUV and X-ray optics" by Z. Wang and A. G. Michette in: Proceedings of SPIE Vol. 4145 (2001) pages 243-253, indicate examples of EUV mirrors having a broadband effect in which the broadband nature is achieved by virtue of the fact that the layer thicknesses of the individual layers of the multilayer coating vary individually in the depth direction of the multilayer arrangement as a result of an optimization process. Such multilayer arrangements having a stochastic sequence of individual layers optimized using a simulation program are also referred to as "depth-graded multilayers". The production of such multilayer arrangements can be difficult since layers having many different layer thicknesses have to be produced successively in a coating process.

EUV mirrors comprising an aperiodic multilayer arrangement are also known from WO 2009/043374 A1. The multilayer arrangement comprises a protective layer ("capping layer") on the radiation entrance side. The layer thicknesses of individual layers vary chaotically here in at least one partial region of the multilayer arrangement.

The prior art discloses broadband EUV mirrors for normal or almost normal incidence of radiation which comprise a multilayer arrangement having different groups of layer pairs. A near-surface layer group (surface layer film group) is arranged at the radiation entrance side of the multilayer arrangement. An additional layer follows opposite the radiation entrance side. This is followed, in the direction of the substrate, by a deeper group of layer pairs (deep layer film group). In this case, the reflectivity of the near-surface layer group is higher than the reflectivity of the near-substrate deeper layer group and the reflected radiation is phase-shifted on account of the presence of the additional layer such that a reflectivity peak value of the entire multilayer arrangement is lower and the reflectivity is higher by the peak wavelength than in the absence of the additional layer. The optical layer thickness of the additional layer is intended to be approximately one quarter of the wavelength of the EUV radiation (i.e. $\lambda/4$) or half of the period thickness of the multilayer arrangement or is intended to correspond to this value plus an integral multiple of the period thickness.

SUMMARY

A problem addressed by the invention is that of providing an EUV mirror which has only a small variation of the reflectance over a large angle of incidence range and which can furthermore be produced reproducibly with high precision.

In order to solve this problem, the invention provides an EUV mirror having the features of the independent claim(s). Furthermore, an optical system comprising an EUV mirror having the features as claimed is provided. Advantageous developments are specified in the dependent claims. The wording of all the claims is incorporated by reference in the content of the description.

The first layer group has a sufficiently high number of first layer pairs which overall form a multiplicity of interfaces between relatively high refractive index and relatively low refractive index layer material which in each case reflect a portion of the incident EUV radiation, such that the first layer group overall has a reflective effect for the radiation and makes a substantial contribution to the total reflectivity of the multilayer arrangement. In order to achieve this, the first layer group has at least ten first layer pairs. Significantly more than 10 first layer pairs may also be provided, for example 15 or more, or 20 or more, or 30 or more, or 50 or more, first layer pairs.

A layer pair comprises in each case a first layer composed of a relatively high refractive index layer material and a second layer composed of a relatively low refractive index layer material with respect thereto. Such layer pairs are also referred to as "period", "double layer" or "bilayer" and may be characterized by a period thickness which, in the context of this application, corresponds to the sum of the (geometrical or optical) layer thicknesses of all the layers of a first layer pair. In addition to the two layers composed of relatively high refractive index and relatively low refractive index layer material, a layer pair may also comprise one or more further layers, for example an interposed barrier layer for reducing the interdiffusion between adjacent layers. The nominal layer thicknesses of one of the layer materials (first layer material or second layer material) are definable by a simply monotonic first layer thickness profile function depending on the period number, while the layer thicknesses of the other of the layer materials (second layer material or first layer material) varies, depending on the period number, in accordance with a second layer thickness profile function. In this case, the "period number" relates to a numbering of the directly successive periods or layer pairs beginning on the side facing the substrate and ending at the radiation entrance side of the first layer group. The period number may also be referred to as the layer pair number.

The nominal layer thicknesses of the individual layers of the layer pairs thus follow specific layer thickness profile functions, wherein the nominal layer thickness of a respective layer results as a function value of the layer thickness profile function for the respective argument (period number or layer pair number). In this case, the actual layer thicknesses need not correspond to the mathematically exact function values of the layer thickness profile function (i.e. the nominal layer thicknesses). Rather, the actual layer thicknesses are permitted to deviate, within the scope of manufacturing tolerances, from that function value which results from the respective layer thickness profile function. Manufacturing tolerances may be, per individual layer, e.g. in the region of 5% or a maximum of 10% of the absolute layer thickness of the individual layer.

For one of the layer materials (first layer material or second layer material) the (nominal) layer thicknesses follow a simply monotonic first layer thickness profile function. This denotes here a layer thickness profile function which can be completely described analytically by a maximum of five layer thickness parameters. The inventors have recognized that considerable advantages regarding the precision of the layer thicknesses during production and/or for the stability of the multilayer arrangement produced can be achieved as a result.

The layer thicknesses which follow the simply monotonic first layer thickness profile function thus do not vary arbitrarily or in a complicated manner, but rather follow a certain systematization that can be parameterized relatively simply. Such a systematization makes it possible, for example, to deduce manufacturing faults more easily from measurements. Furthermore, for example, the layer roughness of a layer can be better set and/or controlled if the layer thickness of said layer material follows a simply monotonic first layer thickness profile function. In practice, it should be assumed, for example, that a coating apparatus can vary over time with regard to some properties relevant to the coating result during the entire coating process, that is to say during the production of the successive individual layers of a multilayer arrangement. As a result, it normally becomes difficult to deduce the layer thicknesses of the respective individual layers from the results of measurements, for example reflectivity measurements. In this regard, it is possible, for example, that errors in determining the coating rate result in a linear error of the layer thickness, such that the magnitude of the error is dependent on the design layer thickness (i.e. the nominal layer thickness). Alternatively or additionally, a linear drift of the individual layer thicknesses may arise on account of variations in the coating apparatus during coating, such that, for example, instead of a selected layer material having a layer thickness that is constant over many layer pairs, the result is a gradual increase or decrease in the layer thicknesses of said layer material with increasing distance from the substrate. If the first layer thickness profile function is a linear function, then these two effects need not be determined separately, and so it is possible to interpret the results of the measurements more easily. By contrast, if the nominal layer thicknesses did not follow a simply monotonic layer thickness profile function, then both errors would have to be known separately in order to be able to determine the correct layer thicknesses.

The layer thickness of the other layer material should vary, depending on the layer pair number, in accordance with a second layer thickness profile function, such that layer thickness differences that are significantly outside the manufacturing tolerances arise for this other layer material within the first layer group.

By combining these stipulations for the layer thicknesses, it is possible to realize multilayer arrangements or EUV mirrors which, with sufficiently high reflectivity in the angle space, have a sufficiently small variation of the reflectivity for specific angle of incidence intervals and which at the same time can be produced reproducibly with high precision.

The stated conditions apply to EUV mirrors independently of whether the layer thickness is specified as a geometrical layer thickness or as an optical layer thickness (product of geometrical layer thickness and real part of the refractive index), since the real part of the refractive index for the relevant materials is close to 1.

In the case of the claimed invention, the first layer thickness profile function is completely definable by one, two or three layer thickness parameters. When this condition is complied with, therefore, a maximum of three layer thickness parameters suffice to completely define the values of the nominal layer thicknesses of one of the layer materials over the entire first layer group. This results in a very simple description of the affected layer thicknesses and a corresponding simple and precise possibility for interpretation of measurement results in order to be able to deduce e.g. uncontrollable variations in the coating process.

In some embodiments, the first layer thickness profile function is a constant function, such that the layer thicknesses of one of the layer materials are constant (within the scope of the tolerances) over the entire first layer group. The first layer thickness profile function is then given by a single layer thickness parameter, namely the desired layer thickness, for example by the specification $$d(n)=a;$$

wherein d(n) is the nominal layer thickness of the affected layers in the layer pair n (where n=1, 2, 3 . . . ) the period number and a is the predefined constant layer thickness of the affected layer materials. The layer material which is intended to be produced with constant layer thickness within the first layer group may be a relatively high refractive index first layer material or a relatively low refractive index second layer material, depending on the material combination.

It may be advantageous for reasons of controlling the layer roughness, for example, not to vary individual layer thicknesses of specific materials. In some embodiments, the layer material which is produced in accordance with a constant first layer thickness profile function is selected from the group molybdenum (Mo), ruthenium (Ru), rhodium (Rh) and palladium (Pd).

In some embodiments, in particular in those in which one of the layer materials in the entire first layer group has substantially the same layer thickness (constant first layer thickness profile function), the second layer thickness profile function defines a stochastic layer thickness distribution of the other layer material. Said other layer material may be silicon (Si), for example. Thus, for example, the layer stress can be predicted even in the case of greatly different layer thicknesses.

In some embodiments, the first layer thickness profile function is a linearly rising or linearly falling function, such that the layer thicknesses of one of the layer materials rise or fall linearly over the entire first layer group. In these cases, it suffices to specify two layer thickness parameters in order to completely determine the nominal layer thicknesses of the affected layer material. The layer thickness profile function can be formulated for example as follows:

$$d(n)=a+b*n,$$

wherein a is an initial value of the respective layer thickness, n=1, 2, 3 . . . is the period number and b is the gradient or the slope of the layer thickness profile function. The gradient or the slope here indicates by what absolute value the layer thicknesses of directly adjacent layers of the same layer material differ.

In some embodiments distinguished by the fact that the first layer thickness profile function is a linearly rising or linearly falling function, it is provided that the second layer thickness profile function is also a linearly rising or linearly falling function. As a result, a particularly simply analyzable description of the nominal layer thicknesses of all the individual layers within the first layer group is possible for both layer materials.

Here it may be that the second layer thickness profile function proceeds in the opposite direction to the first layer thickness profile function, such that, for example, for a linearly falling layer thickness of the first layer material the layer thickness of the second layer material rises linearly, or vice versa. In these cases it may be that the period thickness within the first layer group remains constant or varies only slightly, i.e. to a lesser extent than the individual layer thicknesses. However, it is also possible that the layer thicknesses of both layer materials equally fall linearly or equally rise linearly, wherein the gradients for the individual layer materials may be identical or different. In these cases, the period thickness will likewise rise or fall linearly.

In some embodiments, it is provided that the first layer thickness profile function is a quadratic or an exponential function, thus resulting in a gradual increase or a gradual decrease in the layer thickness of the affected layer material in small systematic steps within the first layer group, wherein moreover the step size, i.e. the layer thickness difference between directly adjacent layers of the same layer material, increases or decreases with increasing distance from the substrate. Quadratic and exponential first layer thickness profile functions can in each case be completely determined by exactly three layer thickness profile parameters a, b and c, for example according to the following equations:

$$d(n)=a+b*\exp(c*n) \quad \text{(exponential)}$$

$$d(n)=a+b*n+c*n^2 \quad \text{(quadratic)}$$

In some embodiments, it is provided that the second layer thickness profile function is a quadratic or an exponential function. In particular, both the first and the second layer thickness profile functions may be a quadratic or an exponential function. In this case, it may be that the second layer thickness profile function proceeds in the opposite direction to the first layer thickness profile function, such that the period thickness varies to a lesser extent than the layer thickness of the more greatly varying individual layer.

It is possible for the first layer group to be the sole layer group of the multilayer arrangement which has a reflective effect for the EUV radiation.

In some cases, further advantageous degrees of freedom arise in the design of the angular dependence of the reflectivity behavior if, in addition to the first layer group, the multilayer arrangement comprises a second layer group having a reflective effect for the radiation and having ten or more second layers pairs, wherein the first layer group is arranged between the substrate and the second layer group. The second layer group is therefore situated at that side of the first layer group which faces away from the substrate, that is to say nearer to the radiation entrance side of the multilayer arrangement. In order to achieve the effect that the second layer group also makes a substantial contribution to the total reflectivity, the second layer group has at least ten second layer pairs. It is also possible to provide significantly more than ten second layer pairs, for example 15 or more, or 20 or more, or 30 or more, or 50 or more, second layer pairs.

The nominal layer thicknesses of the individual layers of the second layer group may be designed according to formation laws similar to or different than the nominal layer thicknesses of the first layer group. In particular, it may be the case that within the second layer group the layer thicknesses of one of the layer materials are definable, depending on the period number, by a simply monotonic first layer thickness profile function and the layer thicknesses of the other of the layer materials vary, depending on the period number, in accordance with a second layer thickness profile function. In exemplary embodiments comprising an entrance-side second layer group, more degrees of freedom arise for the design in order to achieve a relatively homogeneous reflectivity.

By way of example, there are embodiments in which within the first layer group the layer thicknesses of the first layer material and of the second layer material in each case vary linearly in opposite directions and the layer thicknesses of said layer materials within the second layer group, too, vary linearly in opposite directions, but possibly with different initial values and slopes. As a result, in some cases it is possible to achieve particularly small variations of the reflectivity over a relatively large angle of incidence range.

In particular, it may be the case that a variation of layer thicknesses of the layer materials within the first layer group situated closer to the substrate is significantly greater than within the second layer group situated closer to the radiation entrance side. Within the near-substrate first layer group the variation of the layer thicknesses may be e.g. at least double the magnitude or at least three times the magnitude or at least four times the magnitude of that within the second layer group nearer to the radiation entrance side. The term "variation" here denotes the difference between minimum and maximum layer thicknesses of a layer material within a layer group. In the case of a monostack (constant layer thicknesses of both layer materials) the nominal variation is equal to zero. While small layer thickness variations nearer to the radiation entrance side may be expedient for high reflectivity values, large layer thickness variations in the vicinity of the substrate have an expedient effect on the broadband nature in the angle space.

The layer thicknesses of the layer materials within the second layer group may therefore be chosen in such a way that the second layer group yields a relatively large contribution to the maximum reflectivity of the multilayer arrangement, while the first layer group makes contributions to the broadband effect. In some embodiments, within the second layer group one of the layer materials, in particular molybdenum, has a constant layer thickness over the entire second layer group and the layer thickness of the other layer material, in particular silicon, within the second layer group is likewise constant, such that a layer construction similar to that in the case of a "monostack" results within the second layer group.

The invention also relates to an optical system comprising at least one EUV mirror of the type described in greater detail above or below.

The optical system may be e.g. a projection lens or an illumination system for a microlithographic projection exposure apparatus operating with EUV radiation. The EUV mirror may have a plane mirror surface or a convexly or concavely curved mirror surface. In a projection lens, for example, the mirror at which the largest angle of incidence interval occurs may be constructed as described here, if appropriate also a plurality or all of the EUV mirrors. The EUV mirror may be a uniaxially or multiaxially tiltable individual mirror of a controllable multi-mirror array (MMA) at which different angle of incidence intervals may occur depending on the tilting position. A broadband effect may be particularly advantageous here. A multi-mirror array may comprise a plurality of EUV mirrors of the type described here. EUV mirrors may also be used in other optical systems, e.g. in the field of microscopy.

BRIEF DESCRIPTION OF THE DRAWINGS

Further advantages and aspects of the invention emerge from the claims and the subsequent description of preferred exemplary embodiments of the invention, which are explained below on the basis of the figures. In the figures:

DETAILED DESCRIPTION

Aspects of the invention are explained below on the basis of a plurality of exemplary embodiments of EUV mirrors which are assigned for an EUV operating wavelength of $\lambda=13.5$ nm and for angles of incidence from the interval $10°<AOI<17.5°$, that is to say for a mean angle of incidence $AOI_M=13.75°$. In this case, the angle of incidence (AOI) denotes the angle formed by a ray impinging on the mirror surface relative to the normal N to the surface of the mirror at the point of incidence (cf. FIG. 1). Angle of incidence intervals of this type may occur for example in optical systems for EUV microlithography which operate with a high numerical aperture.

In the case of such angles of incidence, as is known, multilayer mirrors comprising a multilayer arrangement having a reflective effect for the EUV radiation are used which contain many layer pairs (bilayers) having alternately applied layers of a layer material having a higher real part of the refractive index (also called "spacer") and a layer material having relative thereto a lower real part of the refractive index (also called "absorber"). Layer pairs can be constructed e.g. with the layer material combinations molybdenum/silicon (Mo/Si) and/or ruthenium/silicon (Ru/Si). In this case, silicon respectively forms the spacer material, while Mo and/or Ru serve as absorber material. A layer pair may contain at least one further layer, in particular an interposed barrier layer, which may consist e.g. of C, $B_4C$, $Si_xN_y$, SiC or a composition comprising one of said materials and is intended to prevent interdiffusion at the interface.

The exemplary embodiments illustrated below are intended to serve for elucidating some basic principles. Molybdenum (Mo) and silicon (Si) are used in each case as layer materials, thus resulting in a clear illustration. The basic principles can also be used for other wavelengths, other angle of incidence intervals and/or other layer material combinations. Moreover, the basic principles act independently of the use of barrier layers and/or protective layers which may additionally be provided in a layer stack.

Figure 1:
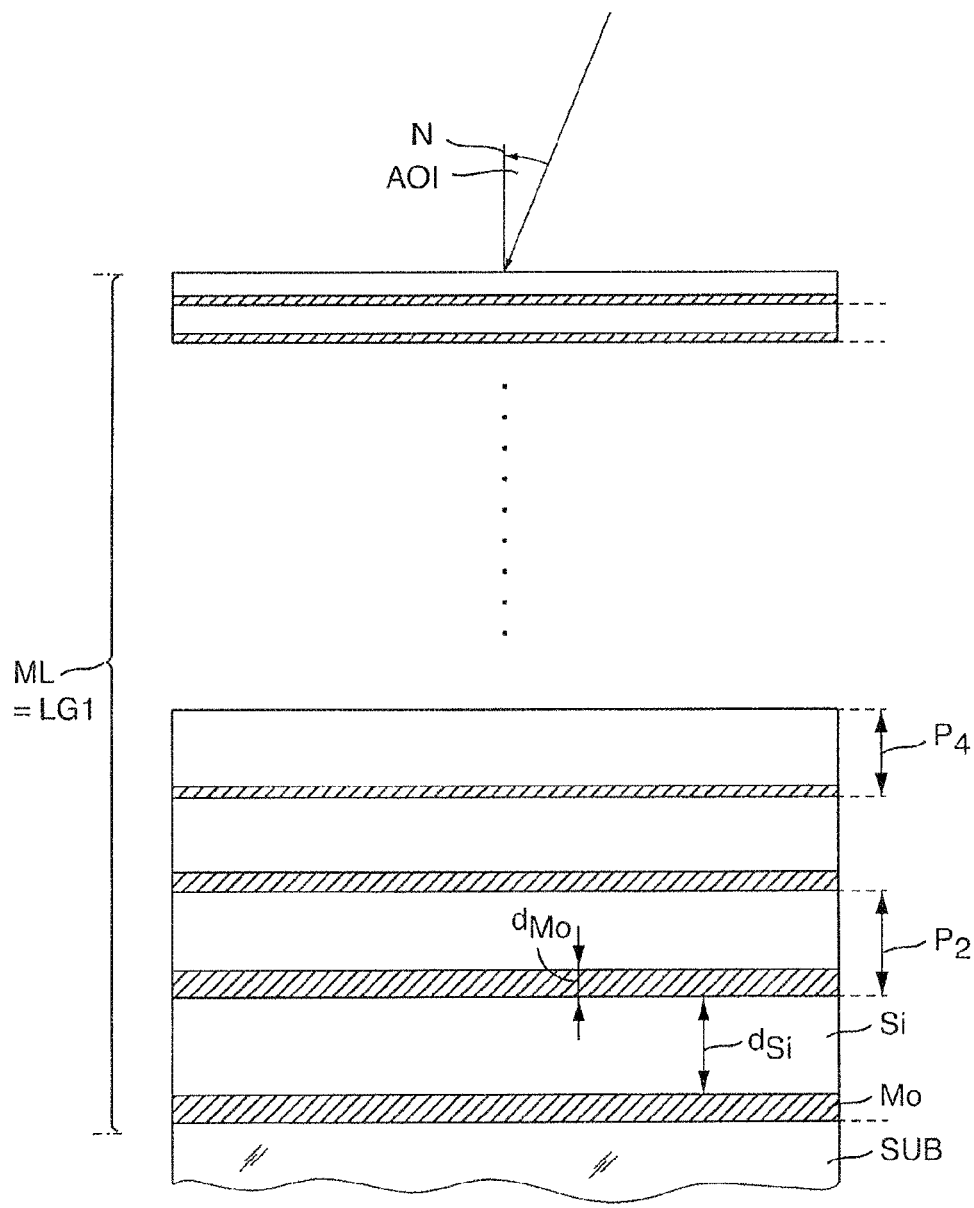
FIG. 1 shows a schematic vertical section through the layer structure of a multilayer arrangement in accordance with a first exemplary embodiment.

FIG. 1 shows a schematic vertical section through the layer structure of a multilayer arrangement ML in accordance with a first exemplary embodiment.

Figure 2:
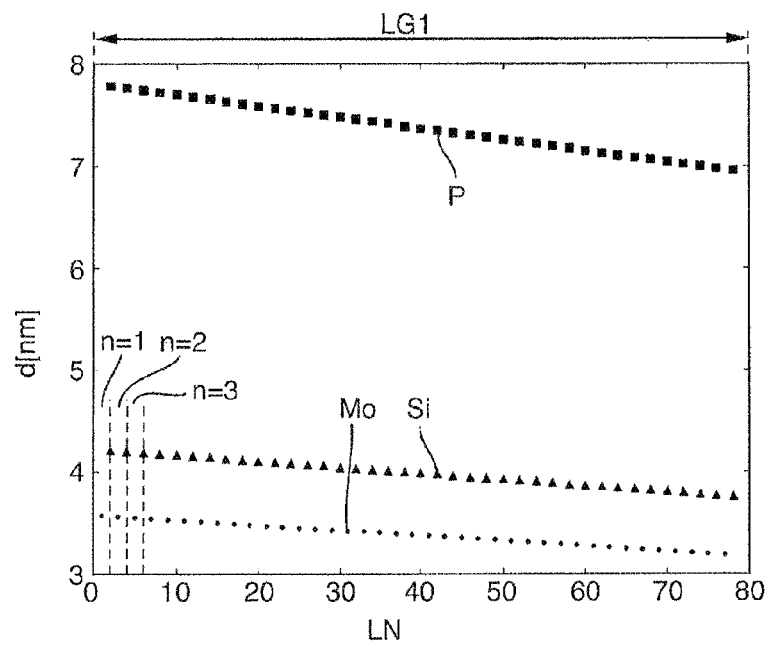
FIG. 2 shows a layer thickness diagram of the first exemplary embodiment.

FIG. 2 shows an associated layer thickness diagram. The layer number LN of the individual layers is indicated on the abscissa and their geometrical layer thickness d in [nm] is indicated on the ordinate. The dotted symbols represent individual layers composed of molybdenum (Mo), while the triangle symbols represent individual layers composed of silicon (Si). The square symbols represent the (geometrical) period thickness P of the layer pairs. The individual layers having layer numbers 1 and 2 belong to the layer pair having the period number 1 (n=1), the directly following individual layers having layer numbers 3 and 4 belong to the layer pair having the period number 2 (n=2) etc. The substrate (not illustrated) is situated on the left-hand side, such that the individual layer having the layer number 1 directly adjoins the substrate. The radiation entrance side accordingly lies on the right at the highest layer number. This manner of illustration applies to all the layer thickness diagrams in this application.

The EUV mirror from FIG. 1 or FIG. 2 has a substrate SUB having a substrate surface processed with optical precision, on which substrate surface a multilayer arrangement ML is applied, which is also referred to hereinafter as "multilayer". In the example, the multilayer arrangement consists of 78 individual layers, wherein molybdenum layers (hatched) and silicon layers (without hatching) alternate. As a result, 39 Mo/Si layer pairs are formed, which are also referred to as Mo/Si bilayers or periods.

The multilayer arrangement ML is substantially or exclusively formed by a first layer group LG1 having a reflective effect for the impinging EUV radiation and comprising 39 first layer pairs, namely the 39 Mo/Si layer pairs. In the case of this material pairing, the layer material silicon is that layer material having the higher real part of the refractive index, that is to say the relatively high refractive index first layer material, while molybdenum at the EUV wavelength has a relatively lower real part of the refractive index and is thus the relatively low refractive index second layer material. The geometrical layer thickness of an Si layer is designated by $d_{Si}$, and the geometrical layer thickness of the Mo individual layer is designated by $d_{Mo}$. The sum of the geometrical layer thicknesses of all the individual layers of a layer pair is designated here as the period thickness $P_i$, wherein the index i represents the period number. The period thickness is influenced not only by the layer thicknesses $d_{Mo}$ and $d_{Si}$, but also by the geometrical layer thicknesses of possible further layers, for example of diffusion-inhibiting intermediate layers, the layer thicknesses of which are, however, generally smaller by a multiple than the layer thicknesses of Mo and Si.

Within the first layer group LG1 the layer thickness of the Mo layers falls continuously in accordance with a linear first layer thickness profile function with increasing distance from the substrate in the direction of the radiation entrance side. Directly adjacent Mo layers thus have in each case the same layer thickness difference with respect to one another. The individual layer thicknesses of the Si layers likewise decrease linearly from the substrate side to the radiation entrance side in identical steps, wherein this dependence on the layer pair number is given by a linear second layer thickness profile function. The layer thickness diagram in FIG. 2 elucidates this behavior. The individual layer thicknesses of Mo and Si vary in each case linearly with the layer pair number. The same also applies to the period thickness. The layer thickness profile function depending on the layer pair number n (1<n<39) reads in each case d(n)=a+b*n. The layer thickness parameter a here specifies in each case an initial value of the layer thickness and the layer thickness parameter b specifies the slope or the gradient of the layer thickness profile. For the layer thickness parameters it holds true that:

Mo: a=3.58, b=−0.01
Si: a=4.22, b=−0.01

The influence of this particular layer construction on the dependence of the reflectivity R on the angle of incidence AOI is illustrated with reference to FIG. 5 in comparison with the angle of incidence dependence of the reflectivity of a reference mirror whose multilayer arrangement is embodied as a pure Mo/Si monostack. The term "monostack" here denotes a multilayer arrangement in which all successive layer pairs have the same layer material combination and the same individual layer thicknesses of Mo and Si. The dashed-dotted curve "MS" having a maximum reflection coefficient of approximately 68% at AOI approximately 14.8° shows the angle of incidence dependence of the reflectivity of such a monostack having 26 layer pairs.

The solid line having the designation "1" shows the corresponding reflectivity profile in the case of the first exemplary embodiment (FIGS. 1 and 2), that is to say with a linear fall in the individual layer thicknesses of molybdenum and silicon between substrate and radiation entrance side. It is immediately evident that the maximum reflectivity in the case of the pure monostack with a value of 68% is significantly higher than the reflectivity occurring at the same angle of incidence in the first exemplary embodiment (approximately 64%). However, the variation of the reflectivity over the angle of incidence range in the first exemplary embodiment is significantly smaller than in the case of the pure monostack. While in the reference system the reflectance varies between approximately 60% (at 10°), and approximately 68% (at approximately 15°), that is to say by approximately 8% points, the reflectance in the same angle of incidence interval in the first exemplary embodiment varies only by approximately 6% points, namely between approximately 58% (at 17.5°) and 64% (at approximately 15°). It is thus clear that the linear layer thickness profile in the case of the individual layers leads to a homogenization of the angle of incidence dependence of the reflectivity in the selected angle of incidence range for which the multilayer arrangement is designed.

Figure 3:
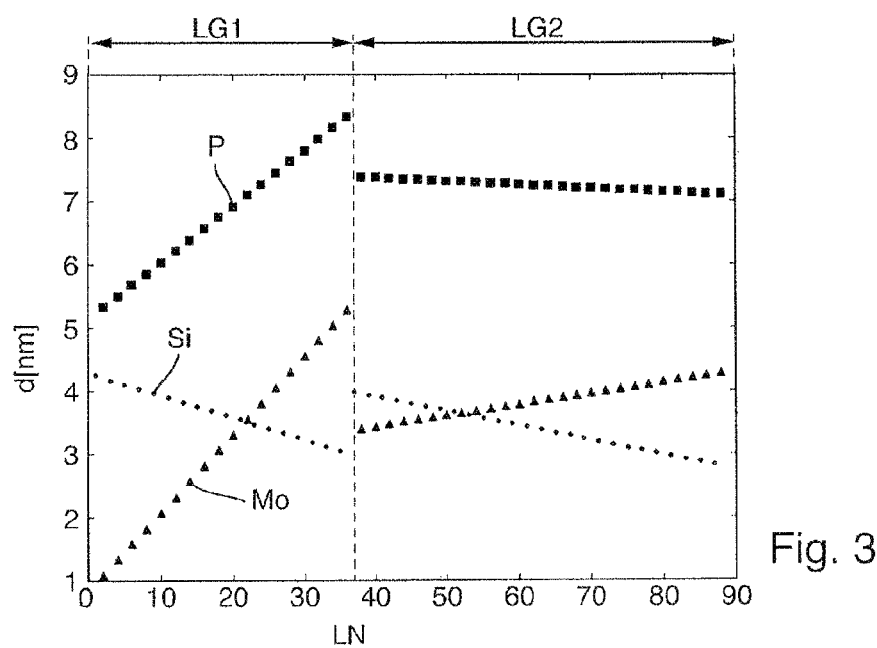
FIG. 3 shows a layer thickness diagram of a second exemplary embodiment.

A second exemplary embodiment is explained with reference to the layer thickness diagram in FIG. 3, said second exemplary embodiment exhibiting, by comparison with the first exemplary embodiment, an again reduced variation of the reflectivity within the selected angle of incidence range, that is to say an improved broadband nature in the angle space. In this exemplary embodiment, the multilayer arrangement has a total of 44 layer pairs or periods distributed between exactly two layer groups each designed differently and arranged one above the other. A first layer group LG1 having 18 first layer pairs is arranged in the vicinity of the substrate. A second layer group LG2 having a total of 26 second layer pairs is applied to said first layer group in such a way that the first layer group LG1 is arranged between the substrate and the second layer group LG2.

In each of the two layer groups the geometrical layer thickness of the Mo individual layers decreases linearly in accordance with a linear first layer thickness profile function from the substrate side to the radiation entrance side, while the layer thicknesses of the Si individual layers increase linearly in each case in accordance with a linear second layer thickness profile function from the substrate side to the radiation entrance side. In both layer groups, therefore, the second layer thickness profile function proceeds in the opposite direction to the first layer thickness profile function. In this case, in the first layer group LG1 the increase in the layer thicknesses of the Si layers is relatively greater than the decrease in the layer thicknesses of the Mo individual layers in the opposite direction, such that the period thickness increases linearly from the substrate side to the radiation entrance side. Within the second layer group LG2, by contrast, the decrease in the layer thicknesses of the Mo layers is relatively greater than the increase in the layer thicknesses of the Si layers in the opposite direction, such that the period thickness decreases slightly in accordance with a linear function from the side of the first layer group or from the substrate side to the radiation entrance side. The variation of layer thicknesses of the layer materials (layer thickness difference between smallest and largest layer thicknesses of a layer material) within the first layer group LG1 is more than four times the magnitude of that within the second layer group LG2. The latter thus has a relatively greatly reflective effect in a manner similar to a "monostack", while the first layer group nearer the substrate increases the broadband nature. If the individual layer thicknesses are specified in each case as a function of the period number or layer pair number n in accordance with the equation $d(n)=a+b*n$, then the following values hold true for the layer thickness parameters:

First layer group LG1 near the substrate (1<n<18):
Mo: a=4.31, b=−0.07
Si: a=0.84, b=0.25
Second layer group LG2 remote from the substrate (1<n<26):
Mo: a=4.03, b=−0.05
Si: a=3.37, b=0.04

For each of the layer groups it is thus possible unambiguously to determine the layer thickness profile of the Mo layers and of the Si layers in each case on the basis of exactly two layer thickness parameters a and b.

Figure 5:
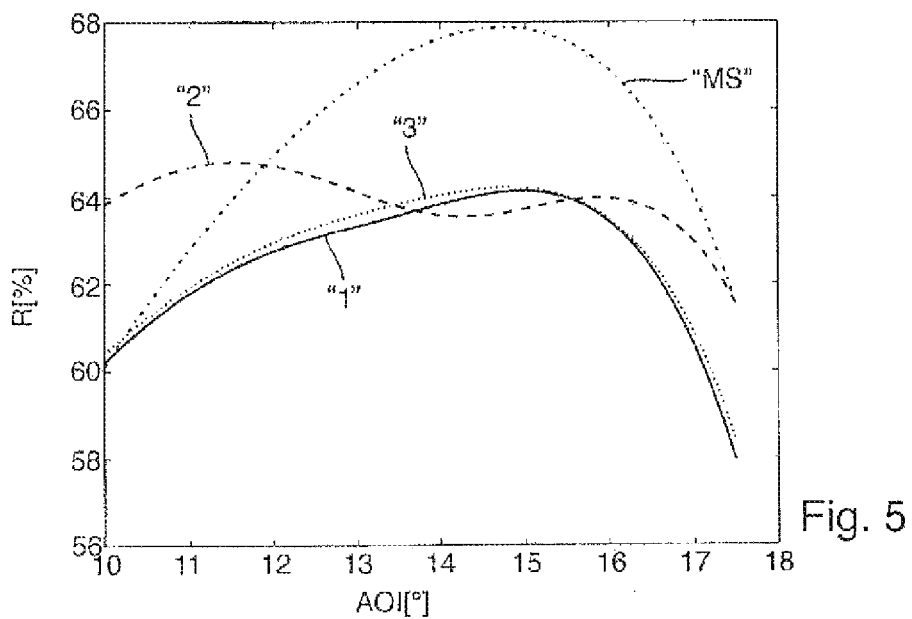
FIG. 5 shows a comparison diagram concerning the angle of incidence dependence of the reflectivities of the first to third exemplary embodiments and of a reference mirror comprising an Mo/Si monostack (MS)

The effect of this layer construction on the angle of incidence dependence of the reflectivity becomes evident with reference to FIG. 5, where the reflectivity curve of the second exemplary embodiment is indicated by the dashed curve having the designation "2". The variation of the reflectivity over the angle of incidence range in the second exemplary embodiment is significantly smaller than in the reference system (monostack) and also significantly smaller than in the first exemplary embodiment. The reflectance varies in the angle of incidence interval between 10° and 17.5° only between approximately 61.5% (at AOI=17.5°) and approximately 64.4% (at AOI approximately 11.4°), wherein the maximum reflectivity of approximately 64.4% is also achieved at said angle of incidence. The reflectance in the angle of incidence interval sought thus varies only by approximately 3% points.

Figure 4:
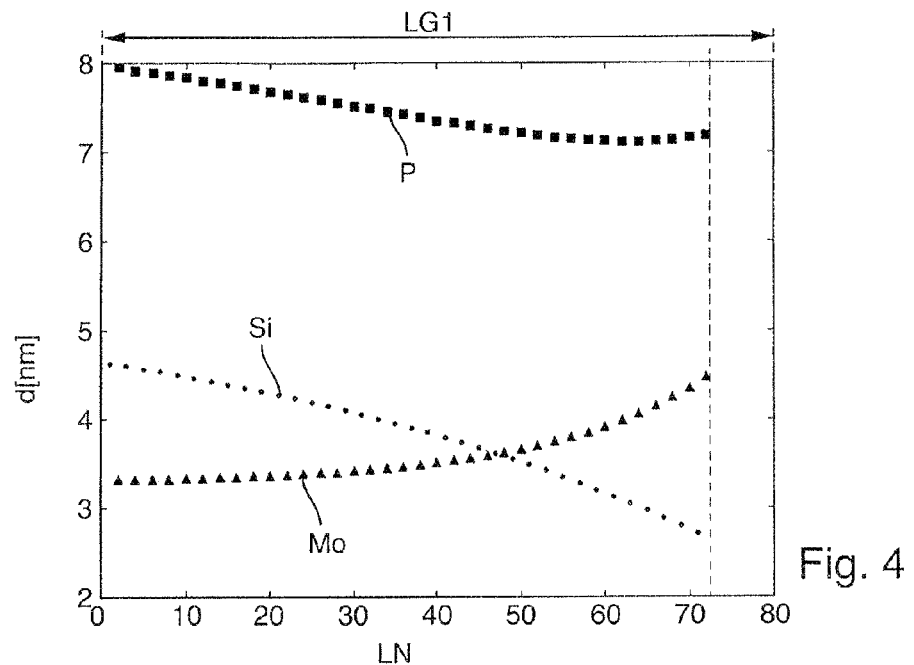
FIG. 4 shows a layer thickness diagram of a third exemplary embodiment.

Other, mathematically relatively simply describable, but nonlinear layer thickness profiles are also possible which can be used for improving the broadband nature in the angle space. A third exemplary embodiment is explained with reference to FIG. 4. In a manner similar to that in the first exemplary embodiment, the multilayer arrangement has only a single first layer group, in which the layer thicknesses of all the individual layers can be defined by simple monotonic layer thickness profile functions. The multilayer arrangement has 36 layer pairs. The individual layer thicknesses for the Mo layers and the Si layers vary in each case in accordance with an exponential layer thickness profile function, wherein the layer thicknesses of the Mo layers decrease exponentially from the substrate side to the radiation entrance side, while the layer thicknesses of the Si layers increase exponentially from the substrate side to the radiation entrance side. The layer thickness profiles are chosen such that the period thickness firstly falls from the substrate side to the radiation entrance side and passes through a minimum at a distance of a few layer pairs from the radiation entrance side, such that the period thickness increases slightly between said minimum and the radiation entrance side. This is principally attributable to the fact that the layer thicknesses of the Si layers in the region of the radiation entrance side rise to a greater extent than the layer thicknesses of the Mo individual layers fall in this section. The layer thickness profile functions depending on the layer pair number n (1<n<36) can be defined in each case by the following layer thickness parameters:

Mo: a=5.57, b=−0.91, c=0.03
Si: a=3.30, b=0.03, c=0.11

For the layer group it is thus possible unambiguously to determine the layer thickness profile of all the Mo layers and all the Si layers in each case on the basis of only three layer thickness parameters a, b and c.

The angle of incidence dependence of the reflectivity of the third exemplary embodiment is evident in FIG. 5 on the basis of the dotted line having the designation "3". The reflectivity profile is very similar to that of the first exemplary embodiment, in which likewise only one first layer group is provided, the layer thicknesses of which follow a relatively simple systematization.

Figure 6:
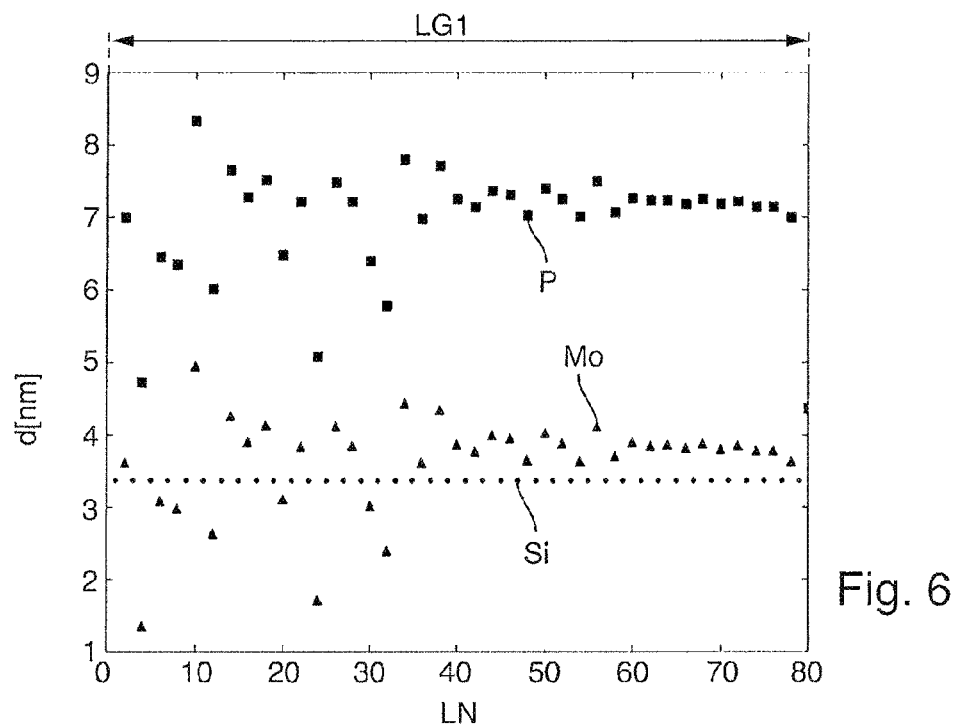
FIG. 6 shows a layer thickness diagram of a fourth exemplary embodiment.

The construction of a multilayer arrangement of a fourth exemplary embodiment is explained with reference to the layer thickness diagram in FIG. 6. The multilayer arrangement here has only a single first layer group LG1 having 40 layer pairs. The Mo layers have the same layer thickness across the entire first layer group, such that the layer thicknesses of the Mo layers can be defined by a very simple monotonic first layer thickness profile function, namely solely by the specification of that constant layer thickness which holds true for all the Mo individual layers. Consequently, only a single layer thickness parameter is required for defining all the Mo layers. By contrast, the layer thicknesses of the other layer material, namely silicon, vary, depending on the period number, in accordance with a stochastic second layer thickness profile function. The fluctuation range of the individual layer thicknesses around a mean value here is relatively large (that is to say that individual layers occur which deviate from the mean value by more than 20%) in the region near the substrate, for example between the layer pair numbers 1 and 20, and decrease significantly in the direction of the radiation entrance side, such that, for example, in the last ten Si layers in the vicinity of the radiation entrance side, the individual layer thicknesses deviate only by a maximum of 5% from a mean value related thereto.

Figure 7:
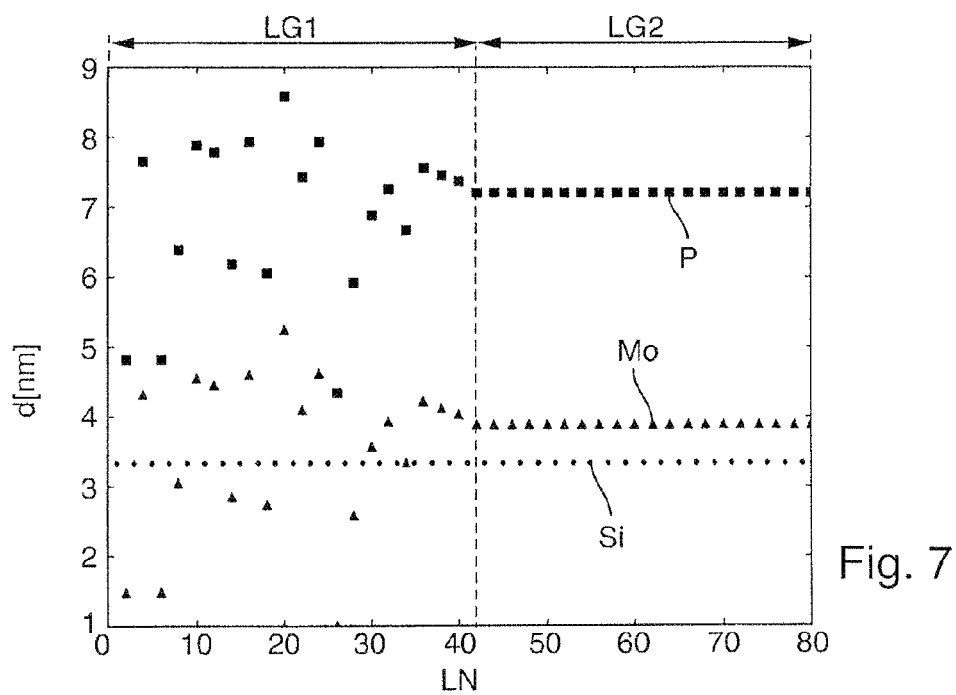
FIG. 7 shows a layer thickness diagram of a fifth exemplary embodiment.

In the fourth exemplary embodiment it is evident that the layer thicknesses of the silicon individual layers at the radiation entrance side do not fluctuate very greatly. A similar optical performance is achievable if the fluctuation range of Si layer thicknesses in the region of the radiation entrance side is reduced to zero, such that not only the Mo layer thicknesses but also the Si layer thicknesses are constant in the region remote from the substrate (in the second layer group). FIG. 7 shows the layer thickness diagram of a corresponding fifth exemplary embodiment. The multilayer arrangement can be subdivided into a first layer group LG1 near the substrate and a second layer group LG2 remote from the substrate. Within the first layer group LG1, comprising a total of 20 layer pairs, the layer thickness of the molybdenum individual layers is constant while the layer thicknesses of the Si individual layers and thus also the period thicknesses vary in a randomly distributed manner. A second layer group LG2 having a total of 20 layer pairs is applied to said first layer group LG1. The second layer group LG2 is constructed in the manner of a "monostack" by virtue of the fact that both the Mo layer thicknesses and the Si layer thicknesses are in each case constant in all the second layer pairs.

Figure 8:
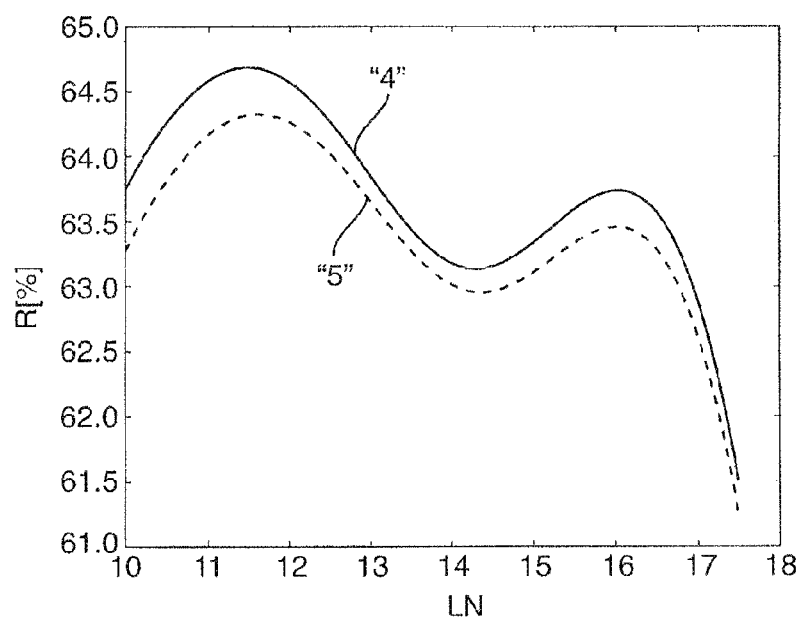
FIG. 8 shows a comparison diagram concerning the angle of incidence dependence of the reflectivities of the fourth and fifth exemplary embodiments.

Similarities and differences of the reflectivity curves become clear with reference to FIG. 8, in which the solid curve "4" shows the reflectivity profile of the fourth exemplary embodiment and the dashed curve "5" shows the reflectivity profile of the fifth exemplary embodiment. In the fourth exemplary embodiment a maximum reflectivity of 64.7%, at an angle of incidence of approximately 11.5° is achieved, and the variation of the reflectivity in the angle of incidence range under consideration is approximately 4% points (between approximately 64.7% and approximately 61.5% at 17.5°). In the fifth exemplary embodiment, a similar variation of the reflectivities results, but the reflectivity level overall is lowered by approximately 0.3% points relative to the fourth exemplary embodiment. If the slight performance disadvantages of the fifth exemplary embodiment are acceptable for the application, it is possible to choose a bipartite layer construction similar to the fifth exemplary embodiment, in which the second layer group LG2 remote from the substrate, on account of the uniform layer thicknesses, can be produced more easily than in the case of the fourth exemplary embodiment.

In all the exemplary embodiments an intermediate layer may be arranged between the substrate and the first layer pair of the first layer group nearest to the substrate, which intermediate layer may in turn be constructed from one or more individual layers. Such intermediate layers may be provided for example for reducing stresses between the substrate and the reflective first layer group of the multilayer arrangement. In any case a monolayer or multilayer cap layer for protecting the multilayer arrangement against oxidation and other harmful influences may be provided on the radiation entrance side. The cap layer may for example contain a layer composed of ruthenium (Ru) or be formed by such a layer.

Some of the exemplary embodiments shown have exactly one layer group (first layer group), while others of the exemplary embodiments shown have exactly two layer groups (first and second layer groups). It is also possible for a multilayer arrangement to comprise more than two reflective layer groups, e.g. three or four layer groups or more, wherein at least one first layer group having the systematically simple layer thickness profiles described must be contained.

By way of example, a multilayer arrangement may comprise exactly three layer groups in which the layer thicknesses of the layer materials in each case follow a linear layer thickness profile function. A multilayer arrangement may thus comprise not only more than two (in each case reflective) layer groups, but also more than two (in each case reflective) layer groups having in each case simple layer thickness profiles. By way of example, a variant of the example shown in FIG. 3 might be constructed such that ten or more of the periods situated at the radiation entrance side (e.g. layer numbers 60 to 90) are replaced by a "monostack" having a corresponding number of layer pairs having constant layer thicknesses of both layer materials.

A first and a second layer group may lie one on top of the other directly, i.e. without the interposition of an intermediate layer. It is also possible to arrange an intermediate layer between the first and second layer groups, which intermediate layer may consist of a single or a plurality of individual layers.

EUV mirrors of the type described in this application can be used in various optical systems, e.g. in the field of EUV microlithography.

Figure 9:
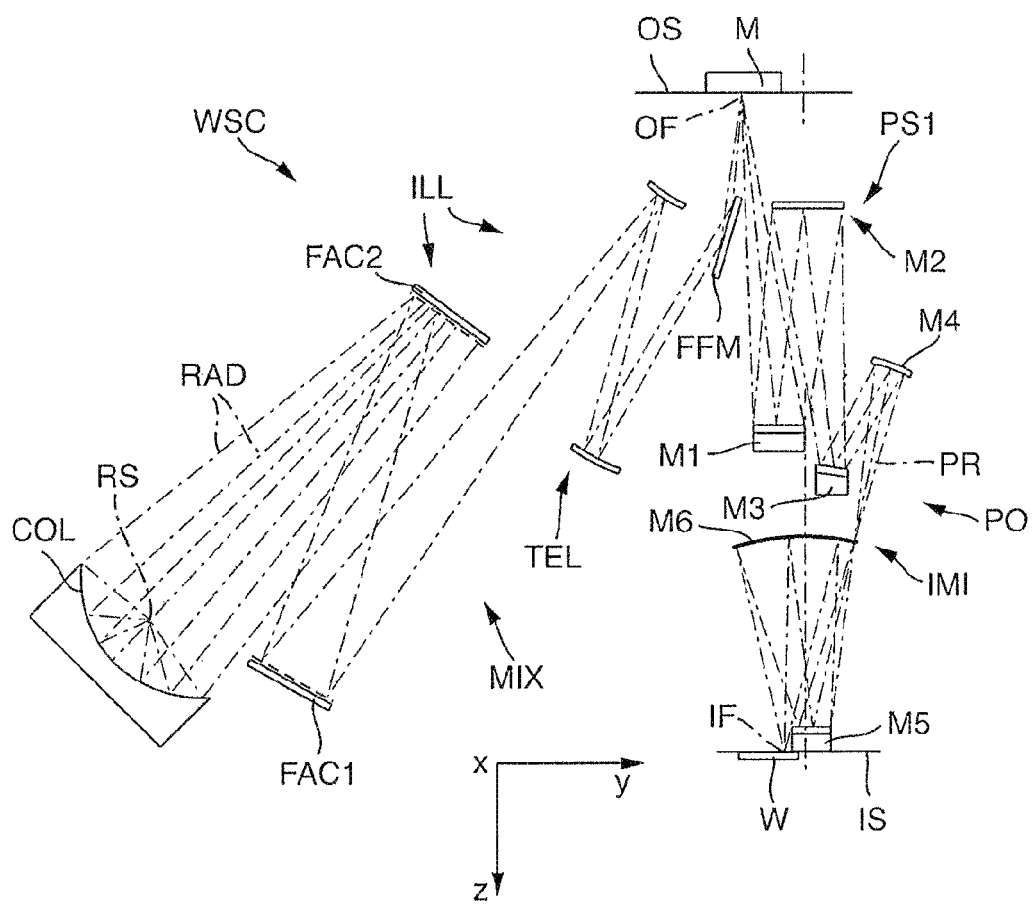
FIG. 9 shows components of an EUV microlithographic projection exposure apparatus in accordance with one embodiment of the invention.

FIG. 9 shows by way of example optical components of an EUV microlithographic projection exposure apparatus WSC in accordance with one embodiment of the invention. The EUV microlithographic projection exposure apparatus serves for the exposure of a radiation-sensitive substrate W arranged in the region of an image plane IS of a projection lens PO with at least one image of a pattern of a reflective patterning device or mask M, said pattern being arranged in the region of an object plane OS of the projection lens.

In order to facilitate the description, a Cartesian xyz-coordinate system is indicated, which reveals the respective positional relationship of the components illustrated in the figures. The projection exposure apparatus WSC is of the scanner type. During the operation of the projection exposure apparatus, the mask M and the substrate are moved synchronously in the y-direction and thereby scanned.

The apparatus is operated with the radiation from a primary radiation source RS. An illumination system ILL serves for receiving the radiation from the primary radiation source and for shaping illumination radiation directed onto the pattern. The projection lens PO serves for imaging the structure of the pattern onto a light-sensitive substrate.

The primary radiation source RS may be, inter alia, a laser plasma source or a gas discharge source or a synchrotron-based radiation source. Such radiation sources generate a radiation RAD in the EUV range, in particular having wavelengths of between 5 nm and 15 nm. In order that the illumination system and the projection lens can operate in this wavelength range, they are constructed with components which are reflective to EUV radiation.

The radiation RAD emerging from the radiation source RS is collected by a collector COL and guided into the illumination system ILL. The illumination system comprises a mixing unit MIX, a telescope optical unit TEL and a field forming mirror FFM. The illumination system shapes the radiation and thereby illuminates an illumination field situated in the object plane OS of the projection lens PO or in the vicinity thereof. In this case, the shape and size of the illumination field determine the shape and size of the effectively used object field OF in the object plane OS.

A reflective reticle or some other reflective patterning device is arranged in the object plane OS during the operation of the apparatus.

The mixing unit MIX substantially consists of two facet mirrors FAC1, FAC2. The first facet mirror FAC1 is arranged in a plane of the illumination system which is optically conjugate with respect to the object plane OS. Therefore, it is also designated as a field facet mirror. The second facet mirror FAC2 is arranged in a pupil plane of the illumination system that is optically conjugate with respect to a pupil plane of the projection lens. Therefore, it is also designated as a pupil facet mirror.

With the aid of the pupil facet mirror FAC2 and the imaging optical assembly which is disposed downstream in the beam path and which comprises the telescope optical unit TEL and the field forming mirror FFM operated with grazing incidence, the individual mirroring facets (individual mirrors) of the first facet mirror FAC1 are imaged into the object field.

The spatial (local) illumination intensity distribution at the field facet mirror FAC1 determines the local illumination intensity distribution in the object field. The spatial (local) illumination intensity distribution at the pupil facet mirror FAC2 determines the illumination angle intensity distribution in the object field.

The projection lens PO serves for the reducing imaging of the pattern arranged in the object plane OS of the projection lens into the image plane IS that is optically conjugate with respect to the object plane and lies parallel thereto. This imaging is effected with electromagnetic radiation from the extreme ultraviolet range (EUV) around an operating wavelength λ, which in the case of the exemplary embodiment is 13.5 nm.

The projection lens has six mirrors M1 to M6 having mirror surfaces which are arranged in a projection beam path PR between the object plane OS and the image plane IS in such a way that a pattern arranged in the object plane or in the object field OF can be imaged to the image plane or the image field IF by the mirrors M1 to M6.

The mirrors (EUV mirrors) M1 to M6 having a reflective effect for radiation from the EUV range each have a substrate, on which is applied a multilayer arrangement having a reflective effect for radiation from the extreme ultraviolet range, said multilayer arrangement comprising many layer pairs comprising alternately relatively low refractive index and relatively high refractive index layer material.

The mirrors M1 to M6 each have curved mirror surfaces, such that each of the mirrors contributes to the imaging. The rays of the projection beam path which come from the object field OF are firstly incident on the slightly convexly curved first mirror M1, which reflects the rays to the slightly concavely curved second mirror M2. The latter reflects the rays to the convex third mirror M3, which deflects the rays laterally to the concave mirror M4. The latter reflects the rays onto the fifth mirror M5, which is arranged geometrically in proximity to the image plane and which has a slightly convexly curved mirror surface and reflects the rays to the large concave mirror M6, which is the last mirror upstream of the image plane and focuses the rays in the direction of the image field IF.

The projection lens consists of two partial lenses. In this case, the first four mirrors M1 to M4 form a first partial lens, which generates an intermediate image IMI in the ray path between the fourth mirror M4 and the fifth mirror M5. The intermediate image lies in an intermediate image plane that is optically conjugate with respect to the object plane and with respect to the image plane. Geometrically, the intermediate image is arranged alongside the sixth mirror M6. The second partial lens, which consists of the fifth and sixth mirrors, images the intermediate image onto the image plane in a reduced fashion.

Projection exposure apparatuses and projection lenses having this or a similar construction are disclosed for example in the U.S. Pat. No. 7,977,651 B2. The disclosure of said patent is incorporated by reference in the content of this description.

At least one of the mirrors M1 to M6 may have a layer construction in accordance with an embodiment of the invention. A reflective coating having a broadband effect in the angle space may be expedient in particular on the fifth mirror M5, at which the largest angle of incidence interval occurs. It is also possible for a plurality or all of the mirrors M1 to M6 to be designed in accordance with an embodiment of the invention.

In the illumination system ILL, with the exception of the field forming mirror FFM operated with grazing incidence, all mirrors can benefit from multilayer broadband coatings of the type proposed here. This also applies, in particular, to the multiaxially tiltable individual mirrors of the facet mirrors FAC1 and FAC2, which can be operated under different angle of incidence interval ranges on account of the tiltability.

Table A indicates, for all figuratively illustrated exemplary embodiments (B), the geometrical layer thicknesses d [nm] of the individual layers from the layer (LN=1) nearest the substrate to the entrance-side last layer (highest layer number or highest LN value).

TABLE A

| | | B | | | | |
|---|---|---|---|---|---|---|
| | | 1 | 2 | 3 | 4 | 5 |
| | | | | FIG. | | |
| | | 2 | 3 | 4 | 6 | 7 |
| LN | Material | d [nm] | d [nm] | d [nm] | d [nm] | d [nm] |
| 1 | Mo | 3.57 | 4.24 | 4.63 | 3.37 | 3.33 |
| 2 | Si | 4.21 | 1.08 | 3.32 | 3.62 | 1.49 |
| 3 | Mo | 3.56 | 4.17 | 4.6 | 3.37 | 3.33 |
| 4 | Si | 4.2 | 1.33 | 3.32 | 1.35 | 4.32 |
| 5 | Mo | 3.55 | 4.1 | 4.56 | 3.37 | 3.33 |
| 6 | Si | 4.19 | 1.58 | 3.33 | 3.08 | 1.49 |
| 7 | Mo | 3.54 | 4.03 | 4.53 | 3.37 | 3.33 |
| 8 | Si | 4.18 | 1.82 | 3.33 | 2.98 | 3.05 |
| 9 | Mo | 3.53 | 3.96 | 4.5 | 3.37 | 3.33 |
| 10 | Si | 4.16 | 2.07 | 3.34 | 4.96 | 4.55 |
| 11 | Mo | 3.52 | 3.89 | 4.46 | 3.37 | 3.33 |
| 12 | Si | 4.15 | 2.32 | 3.34 | 2.64 | 4.45 |
| 13 | Mo | 3.51 | 3.82 | 4.43 | 3.37 | 3.33 |
| 14 | Si | 4.14 | 2.57 | 3.35 | 4.27 | 2.86 |
| 15 | Mo | 3.5 | 3.75 | 4.39 | 3.37 | 3.33 |

TABLE A-continued

| | | B | | | | |
|---|---|---|---|---|---|---|
| | | 1 | 2 | 3 FIG. | 4 | 5 |
| LN | Material | 2 d [nm] | 3 d [nm] | 4 d [nm] | 6 d [nm] | 7 d [nm] |
| 16 | Si | 4.13 | 2.81 | 3.35 | 3.9 | 4.6 |
| 17 | Mo | 3.49 | 3.68 | 4.35 | 3.37 | 3.33 |
| 18 | Si | 4.12 | 3.06 | 3.36 | 4.14 | 2.73 |
| 19 | Mo | 3.48 | 3.61 | 4.31 | 3.37 | 3.33 |
| 20 | Si | 4.11 | 3.31 | 3.37 | 3.12 | 5.25 |
| 21 | Mo | 3.47 | 3.54 | 4.27 | 3.37 | 3.33 |
| 22 | Si | 4.09 | 3.56 | 3.37 | 3.84 | 4.11 |
| 23 | Mo | 3.46 | 3.47 | 4.23 | 3.37 | 3.33 |
| 24 | Si | 4.08 | 3.8 | 3.38 | 1.71 | 4.61 |
| 25 | Mo | 3.45 | 3.4 | 4.19 | 3.37 | 3.33 |
| 26 | Si | 4.07 | 4.05 | 3.39 | 4.11 | 1 |
| 27 | Mo | 3.44 | 3.33 | 4.15 | 3.37 | 3.33 |
| 28 | Si | 4.06 | 4.3 | 3.41 | 3.84 | 2.58 |
| 29 | Mo | 3.43 | 3.26 | 4.1 | 3.37 | 3.33 |
| 30 | Si | 4.05 | 4.54 | 3.42 | 3.02 | 3.56 |
| 31 | Mo | 3.42 | 3.19 | 4.05 | 3.37 | 3.33 |
| 32 | Si | 4.03 | 4.79 | 3.43 | 2.4 | 3.93 |
| 33 | Mo | 3.41 | 3.12 | 4 | 3.37 | 3.33 |
| 34 | Si | 4.02 | 5.04 | 3.45 | 4.43 | 3.34 |
| 35 | Mo | 3.4 | 3.05 | 3.95 | 3.37 | 3.33 |
| 36 | Si | 4.01 | 5.29 | 3.47 | 3.61 | 4.22 |
| 37 | Mo | 3.39 | 3.99 | 3.9 | 3.37 | 3.33 |
| 38 | Si | 4 | 3.4 | 3.49 | 4.34 | 4.12 |
| 39 | Mo | 3.38 | 3.94 | 3.85 | 3.37 | 3.33 |
| 40 | Si | 3.99 | 3.44 | 3.51 | 3.87 | 4.04 |
| 41 | Mo | 3.37 | 3.89 | 3.79 | 3.37 | 3.33 |
| 42 | Si | 3.97 | 3.48 | 3.53 | 3.77 | 3.88 |
| 43 | Mo | 3.36 | 3.85 | 3.73 | 3.37 | 3.33 |
| 44 | Si | 3.96 | 3.51 | 3.56 | 3.99 | 3.88 |
| 45 | Mo | 3.35 | 3.8 | 3.68 | 3.37 | 3.33 |
| 46 | Si | 3.95 | 3.55 | 3.59 | 3.95 | 3.88 |
| 47 | Mo | 3.34 | 3.75 | 3.62 | 3.37 | 3.33 |
| 48 | Si | 3.94 | 3.58 | 3.62 | 3.65 | 3.88 |
| 49 | Mo | 3.33 | 3.71 | 3.55 | 3.37 | 3.33 |
| 50 | Si | 3.93 | 3.62 | 3.66 | 4.03 | 3.88 |
| 51 | Mo | 3.32 | 3.66 | 3.49 | 3.37 | 3.33 |
| 52 | Si | 3.92 | 3.65 | 3.7 | 3.88 | 3.88 |
| 53 | Mo | 3.31 | 3.62 | 3.42 | 3.37 | 3.33 |
| 54 | Si | 3.9 | 3.69 | 3.75 | 3.64 | 3.88 |
| 55 | Mo | 3.3 | 3.57 | 3.35 | 3.37 | 3.33 |
| 56 | Si | 3.89 | 3.72 | 3.8 | 4.12 | 3.88 |
| 57 | Mo | 3.29 | 3.52 | 3.28 | 3.37 | 3.33 |
| 58 | Si | 3.88 | 3.76 | 3.86 | 3.7 | 3.88 |
| 59 | Mo | 3.28 | 3.48 | 3.21 | 3.37 | 3.33 |
| 60 | Si | 3.87 | 3.79 | 3.92 | 3.9 | 3.88 |
| 61 | Mo | 3.27 | 3.43 | 3.13 | 3.37 | 3.33 |
| 62 | Si | 3.86 | 3.83 | 3.99 | 3.86 | 3.88 |
| 63 | Mo | 3.26 | 3.38 | 3.05 | 3.37 | 3.33 |
| 64 | Si | 3.84 | 3.86 | 4.07 | 3.86 | 3.88 |
| 65 | Mo | 3.25 | 3.34 | 2.97 | 3.37 | 3.33 |
| 66 | Si | 3.83 | 3.9 | 4.15 | 3.81 | 3.88 |
| 67 | Mo | 3.24 | 3.29 | 2.89 | 3.37 | 3.33 |
| 68 | Si | 3.82 | 3.93 | 4.25 | 3.88 | 3.88 |
| 69 | Mo | 3.23 | 3.25 | 2.8 | 3.37 | 3.33 |
| 70 | Si | 3.81 | 3.97 | 4.36 | 3.81 | 3.88 |
| 71 | Mo | 3.22 | 3.2 | 2.71 | 3.37 | 3.33 |
| 72 | Si | 3.8 | 4 | 4.47 | 3.85 | 3.88 |
| 73 | Mo | 3.21 | 3.15 | | 3.37 | 3.33 |
| 74 | Si | 3.79 | 4.04 | | 3.78 | 3.88 |
| 75 | Mo | 3.2 | 3.11 | | 3.37 | 3.33 |
| 76 | Si | 3.77 | 4.07 | | 3.78 | 3.88 |
| 77 | Mo | 3.19 | 3.06 | | 3.37 | 3.33 |
| 78 | Si | 3.76 | 4.11 | | 3.63 | 3.88 |
| 79 | Mo | | 3.01 | | 3.37 | 3.33 |
| 80 | Si | | 4.14 | | 1 | 3.88 |
| 81 | Mo | | 2.97 | | | |
| 82 | Si | | 4.18 | | | |
| 83 | Mo | | 2.92 | | | |
| 84 | Si | | 4.21 | | | |
| 85 | Mo | | 2.88 | | | |
| 86 | Si | | 4.25 | | | |
| 87 | Mo | | 2.83 | | | |
| 88 | Si | | 4.28 | | | |

What is claimed is:

1. A mirror for extreme ultraviolet (EUV) radiation comprising:
a substrate and
a multilayer arrangement on the substrate and arranged to reflect the EUV radiation having a wavelength ($\lambda$), wherein:
the multilayer arrangement comprises a multiplicity of layer pairs having alternating layers composed of a high refractive index layer material and a low refractive index layer material, wherein the high refractive index layer material has a larger real part of the refractive index than does the low refractive index layer material at the wavelength ($\lambda$);
the multilayer arrangement comprises a first layer group (LG1) having a reflective effect for the EUV radiation and having ten or more first layer pairs;
each first layer pair comprises a first layer (H) composed of a high refractive index first layer material having a first layer thickness and a second layer (L) composed of a low refractive index second layer material having a second layer thickness and has a respective period thickness (P) totaling a sum of the layer thicknesses of all the layers of each first layer pair;
the layer thicknesses of one of the layer materials are defined, depending on the period number, by a simply monotonic first layer thickness profile function which is completely defined by one, two or three layer thickness parameters;
the layer thicknesses of the other of the layer materials vary, depending on the period number, in accordance with a second layer thickness profile function; and
the first layer thickness profile function is a linearly rising or linearly falling function, such that the layer thicknesses of one of the layer materials increase linearly or decrease linearly over an entirety of first layer group (LG1).

2. The EUV mirror as claimed in claim 1, wherein the first layer group (LG1) comprises fifteen or more first layer pairs.

3. The EUV mirror as claimed in claim 2, wherein the first layer group (LG1) comprises 50 or more first layer pairs.

4. The EUV mirror as claimed in claim 1, wherein the second layer thickness profile function proceeds in a direction opposite to the first layer thickness profile function.

5. An optical system comprising at least one EUV mirror as claimed in claim 1.

6. The optical system as claimed in claim 5, wherein the optical system is a projection lens or an illumination system for a microlithographic projection exposure apparatus.

7. The EUV mirror as claimed in claim 1, wherein the second layer thickness profile function is a linearly rising or linearly falling function.

8. A mirror for extreme ultraviolet (EUV) radiation comprising:
a substrate and
a multilayer arrangement on the substrate and arranged to reflect the EUV radiation having a wavelength ($\lambda$), wherein:
the multilayer arrangement comprises a multiplicity of layer pairs having alternating layers composed of a high refractive index layer material and a low refractive index layer material, wherein the high refractive index layer material has a larger real part of the refractive index than does the low refractive index layer material at the wavelength ($\lambda$);
the multilayer arrangement comprises a first layer group (LG1) having a reflective effect for the EUV radiation and having ten or more first layer pairs;
each first layer pair comprises a first layer (H) composed of a high refractive index first layer material having a first layer thickness and a second layer (L) composed of a low refractive index second layer material having a second layer thickness and has a respective period thickness (P) totaling a sum of the layer thicknesses of all the layers of each first layer pair;
the layer thicknesses of one of the layer materials are defined, depending on the period number, by a simply monotonic first layer thickness profile function which is completely defined by one, two or three layer thickness parameters;
the layer thicknesses of the other of the layer materials vary, depending on the period number, in accordance with a second layer thickness profile function; and
the second layer thickness profile function is a linearly rising or linearly falling function.

9. The EUV mirror as claimed in claim 8, wherein the first layer thickness profile function is a quadratic or an exponential function.

10. The EUV mirror as claimed in claim 8, wherein the second layer thickness profile function proceeds in a direction opposite to the first layer thickness profile function.

11. The EUV mirror as claimed in claim 9, wherein the second layer thickness profile function proceeds in a direction opposite to the first layer thickness profile function.

12. The EUV mirror as claimed in claim 8, wherein the second layer thickness profile function proceeds in a direction opposite to the first layer thickness profile function.

13. A mirror for extreme ultraviolet (EUV) radiation comprising:
a substrate and
a multilayer arrangement on the substrate and arranged to reflect the EUV radiation having a wavelength ($\lambda$), wherein:
the multilayer arrangement comprises a multiplicity of layer pairs having alternating layers composed of a high refractive index layer material and a low refractive index layer material, wherein the high refractive index layer material has a larger real part of the refractive index than does the low refractive index layer material at the wavelength ($\lambda$);
the multilayer arrangement comprises a first layer group (LG1) having a reflective effect for the EUV radiation and having ten or more first layer pairs;
each first layer pair comprises a first layer (H) composed of a high refractive index first layer material having a first layer thickness and a second layer (L) composed of a low refractive index second layer material having a second layer thickness and has a respective period thickness (P) totaling a sum of the layer thicknesses of all the layers of each first layer pair;
the layer thicknesses of one of the layer materials are defined, depending on the period number, by a simply monotonic first layer thickness profile function which is completely defined by one, two or three layer thickness parameters;
the layer thicknesses of the other of the layer materials vary, depending on the period number, in accordance with a second layer thickness profile function;
the multilayer arrangement comprises a second layer group (LG2) having a reflective effect for the radiation and having ten or more second layer pairs, wherein the first layer group (LG1) is arranged between the substrate and the second layer group (LG2); and
the layer thicknesses of the first layer material and of the second layer material within the first layer group (LG1) and within the second layer group (LG2) vary linearly in respectively opposite directions.

14. The EUV mirror as claimed in claim 13, wherein within the second layer group (LG2) the layer thicknesses of one of the layer materials are defined, depending on the period number, by a simply monotonic first layer thickness profile function and the layer thicknesses of the other of the layer materials vary, depending on the period number, in accordance with a second layer thickness profile function.

15. A mirror for extreme ultraviolet (EUV) radiation comprising:
a substrate and
a multilayer arrangement on the substrate and arranged to reflect the EUV radiation having a wavelength ($\lambda$), wherein:
the multilayer arrangement comprises a multiplicity of layer pairs having alternating layers composed of a high refractive index layer material and a low refractive index layer material, wherein the high refractive index layer material has a larger real part of the refractive index than does the low refractive index layer material at the wavelength ($\lambda$);
the multilayer arrangement comprises a first layer group (LG1) having a reflective effect for the EUV radiation and having ten or more first layer pairs;
each first layer pair comprises a first layer (H) composed of a high refractive index first layer material having a first layer thickness and a second layer (L) composed of a low refractive index second layer material having a second layer thickness and has a respective period thickness (P) totaling a sum of the layer thicknesses of all the layers of each first layer pair;
the layer thicknesses of one of the layer materials are defined, depending on the period number, by a simply monotonic first layer thickness profile function which is completely defined by one, two or three layer thickness parameters;
the layer thicknesses of the other of the layer materials vary, depending on the period number, in accordance with a second layer thickness profile function;
the multilayer arrangement comprises a second layer group (LG2) having a reflective effect for the radiation and having ten or more second layer pairs, wherein the first layer group (LG1) is arranged between the substrate and the second layer group (LG2); and
a variation in the layer thicknesses of the layer materials within the first layer group (LG1) is at least double a variation in the layer thicknesses of the layer materials within the second layer group (LG2).

16. The EUV mirror as claimed in claim 15, wherein one of the layer materials has a constant layer thickness over an entirety of the second layer group (LG2) and the layer thickness of the other layer material within the second layer group (LG2) is also constant.

* * * * *

UNITED STATES PATENT AND TRADEMARK OFFICE
CERTIFICATE OF CORRECTION

PATENT NO. : 10,203,435 B2
APPLICATION NO. : 15/215123
DATED : February 12, 2019
INVENTOR(S) : Schicketanz et al.

It is certified that error appears in the above-identified patent and that said Letters Patent is hereby corrected as shown below:

On the Title Page

Page 2, Item [56], Line 8, Delete "1 Opt." and insert -- J. Opt. --, therefor.

Signed and Sealed this
First Day of October, 2019

Andrei Iancu
*Director of the United States Patent and Trademark Office*